US005816026A

United States Patent [19]

Orpen

[11] Patent Number: 5,816,026

[45] Date of Patent: Oct. 6, 1998

[54] HYDRAULIC BALE WRAPPER

[76] Inventor: Kenneth Stephen Eddin Orpen, Jade House, Croyden Road, Westerham, Kent, TN14 ITX, United Kingdom

[21] Appl. No.: 507,446

[22] PCT Filed: Mar. 14, 1994

[86] PCT No.: PCT/GB94/00505

§ 371 Date: Jan. 2, 1996

§ 102(e) Date: Jan. 2, 1996

[87] PCT Pub. No.: WO94/20367

PCT Pub. Date: Sep. 15, 1994

[30] Foreign Application Priority Data

Mar. 12, 1993 [GB] United Kingdom .................. 9305171

[51] Int. Cl.[6] .................................................. B65B 53/00

[52] U.S. Cl. ................................ 53/441; 53/556; 53/587

[58] Field of Search ............................ 53/441, 556, 399, 53/587, 465, 211

[56] References Cited

U.S. PATENT DOCUMENTS

| | | | |
|---|---|---|---|
| 3,145,945 | 8/1964 | Bowen, Jr. . | |
| 3,557,925 | 1/1971 | Zulauf . | |
| 3,759,432 | 9/1973 | Hutzenlaub . | |
| 3,916,598 | 11/1975 | Adams et al. | 53/551 |
| 4,387,548 | 6/1983 | Lancaster | 53/399 |
| 4,628,668 | 12/1986 | Wildmoser | 53/556 |
| 4,712,354 | 12/1987 | Lancaster et al. . | |
| 4,862,678 | 9/1989 | Humphrey | 53/556 |
| 4,905,448 | 3/1990 | Plitt . | |
| 4,953,336 | 9/1990 | Lancaster, III et al. | 53/556 |
| 5,161,349 | 11/1992 | Lancaster, III et al. | 53/556 |
| 5,301,493 | 4/1994 | Chen | 53/556 |
| 5,311,725 | 5/1994 | Martin et al. | 53/556 |

FOREIGN PATENT DOCUMENTS

| | | |
|---|---|---|
| 0 096 635 | 12/1983 | European Pat. Off. . |
| 0 242 975 | 10/1987 | European Pat. Off. . |
| 2 639 023 | 5/1990 | France . |

*Primary Examiner*—Daniel Moon
*Assistant Examiner*—John Paradiso
*Attorney, Agent, or Firm*—Thomas J. Engellenner; Thomas P. Grodt; Lahive & Cockfield, LLP

[57] ABSTRACT

Apparatus for wrapping an article in a film (e.g. a plastics film) comprises a pair of stretch rollers for stretching the film, a film dispenser for delivering the film to the stretch rollers and means for rotating the article to take up stretched film from the stretch rollers, wherein the means for rotating the article comprises a first hydraulic motor and the stretch rollers are driven by a second hydraulic motor connected in series to the first motor to run on the exhaust from the first motor, whereby the ratio of the output of the first and second motors is fixed. One of the pair of stretch rollers constitutes the first of two nipped rollers, the second nipped roller being directly driven by the second motor and geared to the first nipped roller to drive it at the same peripheral velocity. The apparatus may be used for wrapping bales of silage.

12 Claims, 1 Drawing Sheet

HYDRAULIC BALE WRAPPER

This invention is concerned with apparatus for and a method of wrapping articles in film, and in particular for wrapping bales of silage in plastic film.

BACKGROUND TO THE INVENTION

It is common practice to wrap bales of silage in plastics film supplied in rolls. This helps to preserve the silage in the period between being cut and being used as animal fodder.

An important consideration in wrapping practice is the speed of wrapping, and it is desirable to wrap as quickly as possible while using the largest standard (i.e. readily available) width of film.

Other considerations are the ease of control and maintenance costs.

Apparatus for wrapping pallets loaded with goods are known in the art, and such apparatus commonly employs electric motors to rotate the bundle and to provide stretched plastic film via a pair of driven stretch rollers. In such apparatus it is important that the speed of rotation of the bundle relative to the speeds of rotation of the stretch rollers are accurately maintained. This prevents overrun and excessive stretching or the development of slack in the film. Excessive stretching can lead to "necking" in the film, which can result in uneven coverage of the pallet or article to be wrapped. If such apparatus were used for wrapping silage, uneven coverage could lead to spoilage.

However, electrical control systems for accurately and reliably monitoring and regulating the relative speeds of rotation of the article or bundle and the stretch rollers are expensive and difficult to maintain. These disadvantages are exacerbated when high wrapping speeds are required, when even small differences in the relative rotational speeds of the bundle and stretch rollers can lead to overrun and excessive stretching or the development of slack. In such circumstances the electrical control equipment is expensive, difficult to maintain and complicated to operate.

EP-A-0 096 635 discloses method and apparatus for wrapping palletised goods. Film from a roll is drawn around two rollers driven by two motors and prestretched by these rollers before it is applied to the load located on a turntable T driven by a third motor. Between the tensioning or stretching rollers and the load there is a resiliently-supported roller whose position is a function of the film tension. Its position is followed by a tension sensor which feeds a signal to a servo controller. The servo controller governs the speeds of one or more of the motors to ensure the film stretch is kept below the rupture elongation.

FR-A-2 639 023 discloses a film wrapping system having a turntable for the load to be wrapped, which is rotated by a motor. Film is supplied to the load from a supply roll via a roller which is driven by a second motor. For stretching the film, and instead of using a brake system, the two motors are driven such that the speed of turntable motor is always greater than film-delivery motor. The motors are electric motors, for example variable speed motors.

SUMMARY OF THE INVENTION

It is an object of the present invention to provide an improved apparatus for and method of wrapping articles.

It is a further object of the invention to provide a simple and reliable apparatus for and method of wrapping articles at high speeds.

The present invention provides apparatus for wrapping an article in a film (e.g. a plastics film), comprising a pair of stretch rollers for stretching the film, a film dispenser for delivering the film to the stretch rollers and means for rotating the article to take up stretched film from the stretch rollers, wherein the means for rotating the article comprises a first hydraulic motor and the stretch rollers are driven by a second hydraulic motor connected in series to the first motor to run on the exhaust from the first motor, whereby the ratio of the output of the first and second motors is fixed.

In another aspect the invention provides a method of wrapping an article in film (eg. a plastics film), comprising the stop of feeding the film from a dispenser to the article via a pair of stretch rollers while rotating the article by means of a first hydraulic motor, wherein the stretch rollers are driven by a second hydraulic motor connected in series to the first motor to run on the exhaust from the first motor, whereby the ratio of the output of the first and second motors is fixed.

Thus in the apparatus and method of the invention, the relative speeds of rotation of the bundle and the stretch rollers is accurately and simply maintained by employing a first hydraulic motor to drive the bundle and driving the stretch rollers with a second hydraulic motor coupled in series with the first motor to run on the exhaust of the hydraulic motor. In this way the rotation of the bundle and the stretch rollers are effectively coupled so that the ratio of the output of the first and second motors is fixed.

BRIEF DESCRIPTION OF THE INVENTION

An embodiment of the present invention will now be described by way of example with reference to the accompanying drawings in which:

FIG. 1 is a diagrammatic plan view of apparatus according to the present invention for wrapping a bale of silage in plastics film, and FIG. 2 is a circuit diagram showing the arrangement of the hydraulic motors as used in the apparatus of the present invention.

DETAILED DESCRIPTION OF THE INVENTION

Figure 1:
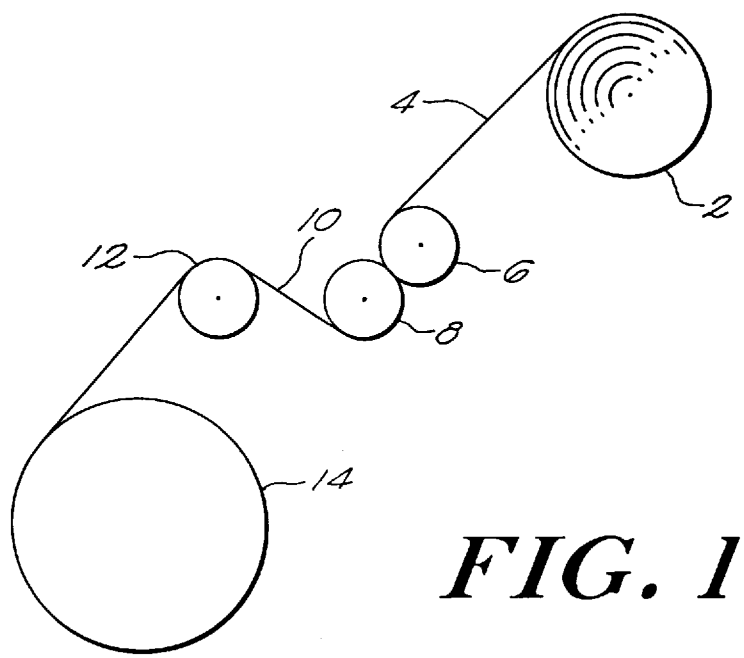
Figure 2:
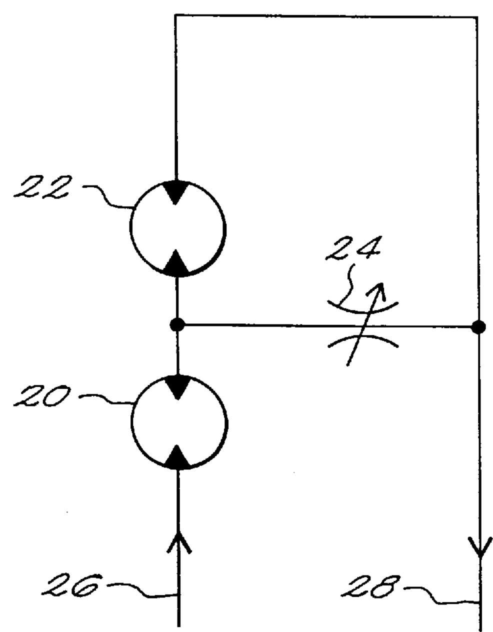

Referring to FIGS. 1 and 2, a bale of silage 14 is mounted on a turntable (not shown) driven by motor 20. The turntable may be driven at up to speeds of 100 r.p.m., though speeds of 60 r.p.m. are normally preferred.

The turntable may have a pair of rollers rotatable about their longitudinal axes so that the bale 14 can be rotated about the turntable axis and simultaneously about its own axis on the turntable rollers.

A film dispenser 2 feeds a roll of film 4 to rollers 6,8 and 12. Rollers 6 and 8 are nipped, and roller 6 is driven by a hydraulic motor 22. Rollers 6 and 8 are geared to run at the same peripheral velocity, and together act to isolate the dispenser 2 from fluctuations in tension in the film arising from variations in the shape of the bale 14.

Rollers 8 and 12 act together as stretch rollers, roller 12 running faster than roller 8 which is geared to the other stretch roller 6 to drive it at, for example, a 55% to 70% higher peripheral velocity. The film 10 passing between rollers 8 and 12 is therefore stretched.

The film is taken up by the bale 14 in the stretched state, and to maintain the film in the stretched state after it leaves the roller 12 a biased jockey (not shown) may be incorporated to maintain the tension in the film 16 passing between roller 12 and bale 14.

The turntable motor 20 and the stretch roller motor 22 are coupled in series by hydraulic hosing 30. The hosing is preferably 0.5 or 0.75 inch (12.7 or 19 mm) bore. Oil is introduced under pressure at the inlet 26 and is returned via the return at 28. The hose is preferably capable of withstanding oil pressures of up to 3000 psi (207 bar).

The coupling between the motors is regulated by a flow control valve 24, which draws off part of the exhaust oil leaving motor 20. Adjustment of the flow control valve 24 permits coupling of the outputs of motors 20 and 22 such that they are effectively coupled.

The circuit may incorporate valves. The valves may act simply as safety valves to prevent overpressure of the motors, but may also be arranged to permit operation of the motors in reverse direction. Such an arrangement may be useful where it is desired to reverse the direction of the turntable. Such reversal may be required after wrapping is completed when the bales can be oriented in a particular way to allow removal from the turntable or automatic ejection e.g by a turntable tilting mechanism.

INDUSTRIAL APPLICABILITY

The invention is applicable to the wrapping of objects with a stretched wrapping film, more particularly to the wrapping of agricultural products. The invention is especially suited for the wrapping of bundles of silage.

I claim:

1. Apparatus for wrapping an article in a film (e.g. a plastics film), comprising a pair of stretch rollers for stretching the film, a film dispenser for delivering the film to the stretch rollers and means for rotating the article to take up stretched film from the stretch rollers, wherein the means for rotating the article comprises a first hydraulic motor and the stretch rollers are driven by a second hydraulic motor connected in series to the first motor, whereby the ratio of the output of the first and second motors is regulated by a flow control valve which controls fluid flow from the first hydraulic motor to the second hydraulic motor.

2. Apparatus according to claim 1 wherein one of the pair of stretch rollers constitutes the first of two nipped rollers, the second nipped roller being directly driven by the second motor and geared to the first nipped roller to drive it at the same peripheral velocity.

3. Apparatus according to claim 2 wherein the stretch roller which constitutes the first of the two nipped rollers is geared to the other stretch roller to drive it at a 55% to 70% higher peripheral velocity.

4. Apparatus according to claim 1 wherein the flow control valve is arranged to be able to bleed off part of the exhaust fluid from the first motor.

5. Apparatus according to claim 1, further comprising a biased jockey which maintains tension in the film between the article and the stretch rollers.

6. Apparatus according to claim 1 wherein the article is a bale of silage.

7. A method of wrapping an article in film (e.g. a plastics film), comprising the step of feeding the film from a dispenser to the article via a pair of stretch rollers while rotating the article by means of a first hydraulic motor, wherein the stretch rollers are driven by a second hydraulic motor connected in series to the first motor, whereby the ratio of the output of the first and second motors is regulated by a flow control valve which controls fluid flow from the first hydraulic motor to the second hydraulic motor.

8. A method according to claim 7 wherein one of the pair of stretch rollers constitutes the first of two nipped rollers, the second nipped roller being directly driven by the second motor and geared to the first nipped roller to drive it at the same peripheral velocity.

9. A method according to claim 8 wherein the stretch roller which constitutes the first of the two nipped rollers is geared to the other stretch roller to drive it at a 55% to 70% higher peripheral velocity.

10. A method according to claims 7 or 8 further comprising the step of employing the flow control valve to bleed off part of the exhaust fluid from the first motor.

11. A method according to claim 7 wherein the method further comprises maintaining tension in the film between the article and the stretch rollers with a biased jockey.

12. A method according to claim 7, wherein in the article is a bale of silage.

* * * * *